UNITED STATES PATENT OFFICE.

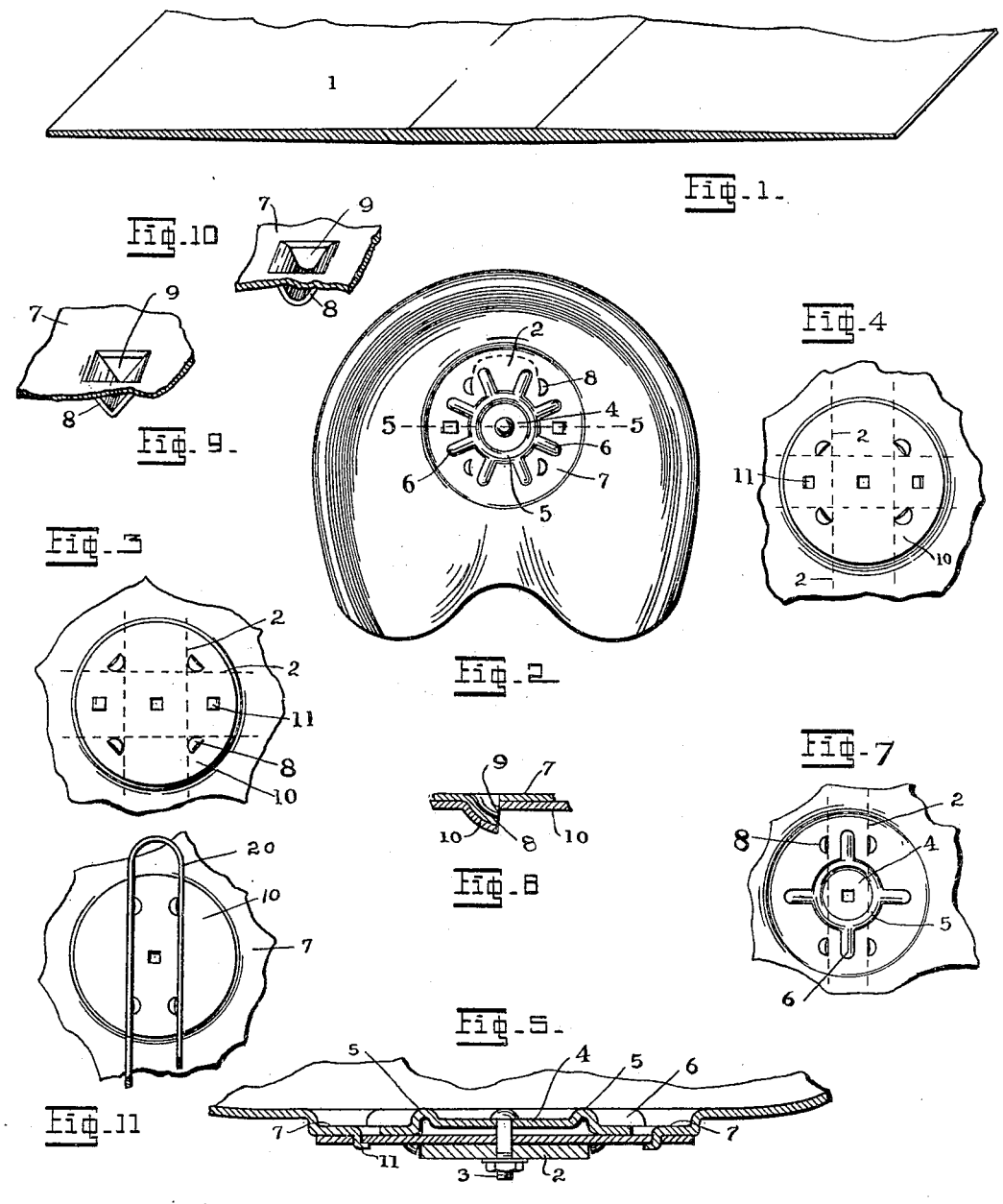

ROBERT T. J. MARTIN, OF ELYRIA, OHIO.

PRESSED-METAL SEAT.

No. 800,458.  Specification of Letters Patent.  Patented Sept. 26, 1905.

Application filed July 26, 1904. Serial No. 218,236.

*To all whom it may concern:*

Be it known that I, ROBERT T. J. MARTIN, residing at Elyria, in the county of Lorain and State of Ohio, have invented a certain new and useful Improvement in Pressed-Metal Seats, of which the following is a full, clear, and exact description, reference being had to the accompanying drawings.

This invention relates to seats for agricultural machines, implements, vehicles, &c., that are made from sheet material, preferably light-gage sheet-steel; and it has for its object the production of such a seat at the least cost, said seat being adapted for attachment to the seat spring, support, or standard in a certain position and readily fastened and held rigidly thereon in that desired and intended position by the necessary bolt or bolts and one that will obviate the objectionable features contained in other seats that have been made from similar material. Among such objections are the weakness of the central portion of the seat through which extend the bolt or bolts that are used for securing the spring support or standard to the seat, the inadequacy of the guides for said seat support or standard, the lack of adaptability of the seat to different widths and arrangements of seat supports or standards, the liability to tear the clothing of the operator, and the lack of strength in a seat of simple and economical construction to withstand the stress to which it is subjected.

The object of this invention is to overcome the above objectionable features and at the same time to provide a seat that shall be simple, durable, and economical of construction.

Figure 1 is a cross-sectional view in perspective, showing a portion of the sheet from which my improved seat is preferably made, said sheet being gradually thickened at and toward its center. Fig. 2 is a top plan view of the completed seat, the same indicating in dotted lines the position of the support beneath the seat. Fig. 3 is a bottom plan view of the central portion of the seat, showing the guides for the support in a different position from those shown in Fig. 2, the same being intended to permit the seat to be reversed or turned about upon the support ninety degrees, the openings made in forming said guides being turned away from the attaching-bolt. Fig. 4 is a view similar to Fig. 3, but showing the guides differently formed, the same having their openings turned toward the attaching-bolt. Fig. 5 is a transverse section through the seat, the same being taken substantially on the line 5 5 of Fig. 2. Fig. 6 is a section taken through the center of the seat at right angles to the line 5 5 and showing the increased thickness of the vertical portion of the blank from which the seat is formed. Fig. 7 is a bottom plan view of the central portion of a seat that is especially adapted for use with both wide and narrow standards or supports, the openings through the guides extending toward the narrow standard or support and being at right angles to the wide support or standard, the position of the narrow one of said standards being indicated by dotted lines. Fig. 8 is an enlarged detail section taken through the center of the guides. Fig. 9 is a perspective view showing a modified form of guide in which the metal is cut on two sides and is depressed between the same, the guides being angular at the bottom. Fig. 10 is a view similar to Fig. 9, showing another modified form of guide in which the bottom portion is rounded; and Fig. 11 is a view showing my improved seat applied to a different form of support.

In the practical use of seats for agricultural machines and the like a great strain is thrown upon the side thereof, which tends not only to distort the shape of the side portions, but to wrench the seat away from the support. To successfully withstand this strain, I preferably form the seat out of a blank that is cut from a sheet of material 1, Fig. 1, the said sheet being thickened at its central portion, so as to be several gages thicker than it is at its edges, and I so form the seat that this thickened portion will extend transversely of the seat in the direction of the line 5 5 of Fig. 2. The blanks from which the seats are made are formed from a sheet which is produced by rolls so shaped that the central part of the blank will be thicker than the edges. When thus made, the seats that are formed therefrom will be of substantial uniform thickness transversely of the seat, but will gradually diminish in thickness toward the front and the rear, as appears from Fig. 6.

The seats are intended to be attached to and supported by a spring, standard, or support, which is indicated at 2 in the various figures, the same appearing in dotted lines in Figs. 2, 3, 4, and 7. The seats are preferably attached to this support by means of a bolt 3, the same having a rounded head that rests upon the central part on the seat. About this bolt-head there is a portion 4 of the seat that is not affected by the process of forming the seat, as it is the normal level of the metal. Being thus unaffected, the fibers of the metal in this part of the seat retain all of their original strength, and this part of the blank being preferably of increasing thickness the strength, as a rule, is sufficient to withstand any strain to which the seat will be subjected. Surrounding this portion is a circular bead or rib 5, and radiating therefrom are a series of ribs 6, the same projecting upwardly to the same level as the bead 5 and substantially to the same level as the top of the bolt-head, thus causing the bolt-head seat to appear to be depressed. This bead and the ribs serve to very materially strengthen the seat about its point of attachment. Beyond the bead 5 and surrounding the rib 6 is a depressed portion 7, that lies in a plane lower than the portion 4, so that the seat and the load thereon is supported thereby. Beyond the depressed portion 7 the seat rises again to substantially the level of the top of the bead and ribs and then extends outwardly to form the sides, back, and front of the seat, which may in these parts be of any form desired.

In order to prevent the seat from twisting about on its support, it is necessary to provide the same with some form of guide which will abut against the support and hold the seat in proper position thereon. These guides I may form by cutting through the metal of the seat and swaging the material of the seat on one side of the cut downwardly, thus forming projections 8, which are preferably of the form shown in Fig. 8, although they may be made as shown in Figs. 9 and 10, hereinafter described. When formed in either manner, an opening 9 is produced, through which any water that may have accumulated on the seat can readily escape. These projections or guides are preferably formed after the other parts of the seat, and they are then located in such positions as will accommodate the width of the support desired, for it will be understood that these seats may be placed upon springs or standards of varying widths. By forming these guides in this way and at this time the same dies may be employed for pressing all of the seats of given shape and size, and the guides may then be so positioned as to accommodate the width of the standard upon which the seat is to be supported. As a rule the supports for the seat extend from front to back thereof, and when it is known that the support is to be thus located the guides are preferably swaged, so that their open face or the part surrounding the opening 9 abut against the sides of the guide. Sometimes, however, it is desirable that the seat be turned through ninety degrees with reference to the support, in which case it is desirable to form the guides so that they will still accommodate the support. Such a guide is illustrated in Figs. 3 and 4, the same being formed obliquely to the center line through the front and the back of the seat. As is indicated in dotted lines in these figures, the support 2 will abut against these guides in whichever position the seat may be placed. It may also be desirable to so locate these guides that the same seat may be used with supports of different widths. In Fig. 4 such an arrangement of the guides is illustrated wherein the support that is indicated as extending vertically is of greater width than the other support. These guides may be turned with their open sides either from the center bolt, as in Fig. 3, or toward said bolt, as in Fig. 4.

In Figs. 9 and 10 I have illustrated modified forms of guides in which the metal is cut in two places and the intervening material pressed downwardly. This material may be formed into different shapes, as may be desired, that shown in Fig. 9 being angular and that in Fig. 10 being rounded.

Although under normal conditions the seat formed from the blank that is cut from the thickened sheet of material will be of sufficient strength to withstand all the strains to which it will be subjected, yet it may be that under some conditions it may be desired to further strengthen the same, in which case I may employ a reinforcing-plate 10, that is secured to the seat preferably by means of depressed lips 11, that are placed through slots in the said reinforcing-plate and are then clenched to upset against the lower side thereof. When such a plate is employed, the guides are preferably formed in both the seat and the plate, as shown in Fig. 8.

As will be seen from an inspection of Fig. 2, the guides 8 are stamped from the seat at points intermediate the radiating ribs 6, of which there are usually eight in number. Sometimes where the seat is to be applied to a narrow standard or support it is impossible because of these ribs to place the guides sufficiently close together to fit the sides of the standards. In such case I prefer to use four radiating ribs, as shown in Fig. 7, in which case it is possible to bring the guides close to the sides of the radiating ribs, so that a narrow spring will fit therebetween. As indicated in this figure, these same guides may also be employed when a wider standard is used, the horizontal standard being in this case wider than the vertical one.

In Fig. 11 I have shown my seat applied to a standard 20, that is bent in a hair-pin position, thus showing the adaptability of my seat to different forms of supports.

While in the specification and drawings it has been necessary to disclose specific forms of my invention, I desire it to be understood that the claims are not intended to be limited thereto, except as to limitations expressly imposed by their terms or by the prior art.

Having thus described my invention, what

I claim as new, and desire to secure by Letters Patent, is—

1. A pressed-metal seat having a central elevated portion for a bolt-head seat and a single flat annular depressed portion surrounding said central portion, said depressed portion providing a load-supporting surface and being of greater diameter than the width of the seat-support and being provided with guides therefor.

2. A pressed-metal seat having a bolt-head seat, a raised bead surrounding the said bolt-head seat, a plurality of raised ribs radiating from the said bead, an annular depressed portion surrounding the bead and the ribs and extending to a lower level than the said bolt-head seat, said depressed portion forming a bearing for sustaining the load, and seat-support guides projecting from said depressed portion.

3. A seat formed from a sheet of material having a raised bead that is substantially concentric with the point of attachment and a plurality of raised ribs radiating from the said bead, and projections that are struck from the seat between the said ribs so as to form openings, for the purpose specified, the said projections extending on opposite sides of the support to form guides therefor.

4. A pressed-metal seat having a slit and a projection formed by depressing the metal at one side of the slit, said projection forming a guide for the seat-support.

5. The combination of a seat-support, a pressed-metal seat having a plurality of slits and a plurality of projections formed by depressing the metal on one side of the slits, said projections being located on opposite sides of the seat-support to form guides for the seat, and the slit providing escapes for water on the seat.

6. The combination of a seat-support, a pressed-metal seat having a plurality of slits and a plurality of projections formed by depressing the metal on one side of the slits, said projections being located on opposite sides of the seat-support with open or abrupt sides lying adjacent the support to form guides therefor, and the slits providing escapes for water on the seat.

7. A seat that is formed from a sheet of material of varying thickness, the thickened portions of the sheet forming those parts of the seat that are subjected to the greatest strain, said seat having a plurality of slits through the thickened portion thereof and a plurality of projections formed by depressing the metal on one side of the slits, a support for said seat, said projections being located on opposite sides of the seat-support with their open or abrupt sides lying adjacent the support to form guides therefor.

8. A seat formed from a sheet of material of varying thickness, the thickened portions of the sheet forming those parts of the seat that are subjected to the greatest strain, a reinforcing-plate secured to the under side of the seat, a support for said seat, the said seat and plate being provided with a plurality of slits and a plurality of projections formed by depressing the metal on one side of the slits, said projections being located on opposite sides of the seat-support with their open or abrupt sides lying adjacent the support to form guides therefor, the slits providing escape for water on the seat.

9. A pressed-metal seat, a reinforcing-plate secured to the lower side of the seat, said seat and reinforcing-plate having slits and a plurality of projections formed by depressing the metal on one side of the slits to form guides for the seat-support, said slits forming openings for the escape of water.

10. A pressed-metal seat having a central portion for a bolt-head seat, an annular depressed portion surrounding said central portion and a reinforcing-plate below said seat and secured to said annular depressed portion.

11. A pressed-metal seat, a reinforcing-plate secured to the lower side of the seat, said reinforcing-plate having slits and a plurality of projections formed by depressing the metal on one side of the slits to form guides for the seat-support.

In testimony whereof I affix my signature in the presence of two witnesses.

ROBERT T. J. MARTIN.

Witnesses:
S. E. FOUTS,
L. LOUIS MALM.